(12) United States Patent
Ryan, Jr. et al.

(10) Patent No.: US 10,748,051 B2
(45) Date of Patent: Aug. 18, 2020

(54) SYSTEM AND METHOD FOR ATTACHING IDENTIFICATION TAGS TO OBJECTS USING A FLEXIBLE ATTACHMENT DEVICE

(71) Applicant: Intelligent Design Systems Inc., Loveland, CO (US)

(72) Inventors: Joseph Marsh Ryan, Jr., Loveland, CO (US); Joseph Marsh Ryan, III, Longmont, CO (US)

( * ) Notice: Subject to any disclaimer, the term of this patent is extended or adjusted under 35 U.S.C. 154(b) by 0 days.

(21) Appl. No.: 16/270,337

(22) Filed: Feb. 7, 2019

(65) Prior Publication Data
US 2020/0005112 A1 Jan. 2, 2020

Related U.S. Application Data

(60) Provisional application No. 62/691,753, filed on Jun. 29, 2018.

(51) Int. Cl.
*G06K 19/06* (2006.01)
*G06K 19/077* (2006.01)
(52) U.S. Cl.
CPC .............................. *G06K 19/07758* (2013.01)

(58) Field of Classification Search
CPC ............. G06K 19/07749; G06K 19/04; G06K 19/07718
USPC .......................................................... 235/492
See application file for complete search history.

(56) References Cited

U.S. PATENT DOCUMENTS

| | | | |
|---|---|---|---|
| 5,331,758 A | 7/1994 | Romick | |
| 7,197,842 B2* | 4/2007 | Ali | ........................ G09F 3/005 40/633 |
| 2006/0254106 A1 | 11/2006 | Fast | |
| 2010/0133224 A1 | 6/2010 | Kolton et al. | |
| 2011/0277359 A1 | 11/2011 | Halberthal et al. | |
| 2016/0004951 A1 | 1/2016 | Norman et al. | |

* cited by examiner

*Primary Examiner* — Jamara A Franklin
(74) *Attorney, Agent, or Firm* — Ellenoff Grossman & Schole LLP; James M. Smedley; Alex Korona

(57) ABSTRACT

The present invention is a system and method for the attachment of a tracking sensor or identification device placed on an object without the need for an attachment tool or fasteners such as adhesives, rivets, screws, or bolts. Through the interaction of the attachment device and the particular portions of the object to which it is attached as to secure the device to the object using tension between the device and object due to the device having flexible prongs which grip the object when properly located on the object.

22 Claims, 3 Drawing Sheets

SYSTEM AND METHOD FOR ATTACHING IDENTIFICATION TAGS TO OBJECTS USING A FLEXIBLE ATTACHMENT DEVICE

CROSS-REFERENCE TO RELATED APPLICATIONS

This application claims the benefit of U.S. Provisional Application No. 62/691,753 filed Jun. 29, 2018, the entire disclosure of which is hereby incorporated by reference in its entirety.

FIELD OF THE INVENTION

The present invention generally relates to physical asset identification, tracking and inventory control devices and systems. Specifically, embodiments of the present invention are directed towards the attachment of an identification device placed on an object without the need for additional attachment tools or fasteners such as adhesives, rivets, screws, or bolts.

BACKGROUND

Fixed and reusable physical asset monitoring and control are perennial concerns in retail, manufacturing, shipping, and various other settings. Operating businesses in these fields often entails the identification, transferring, placement and removal of assets such as reusable containers. In the reusable container and canister sphere, it is preferable to identify and track the movement of assets such as beverage kegs and gas cylinders, among others, as soon as possible after their departure from their location of storage, display, or sale. Typically, it is also desirable to be able to identify asset movement, loss, destruction or theft of these items through an identification sensor, label or tag located on the asset.

In order to identify and monitor of various assets, conventional asset inventory and security systems employing identification technology have been developed to utilize barcode scanners, radio frequency identification (RFID), electronic article surveillance (EAS), weight scales, cables, tethering devices, wireless sensors, and closed-circuit television networks. However, due to the inherent drawbacks and costs of such systems, even when properly implemented, theft or loss of assets is often not detected until long after the occurrence thereof, usually with such theft or loss not being registered until or even after the required return date. This state of affairs results in considerable product and revenue loss due to pilferage and inadequate asset identification and utilization to meet demand. Reducing the cost of asset identification systems is a primary concern to many businesses. One of the main costs associated with attaching asset identification technology such as RFID, barcode tags, sensors and similar identification tags to assets is the labor associated with attaching said identification tags to said assets. Further, attachment mechanisms such as adhesives, rivets, bolts, screws, or stud welds and the tools necessary to install such attachment mechanisms similarly increase the cost of attaching prior-developed identification tags to desired assets.

For the foregoing reasons, there is a need for an identification technology carrier system and method designed to easily and securely attach an identification tag to an asset without relying on expensive fasteners or adhesives, additional labor, or specialized tools to attach said devices to the desired assets. These and other features and advantages of the present invention will be explained and will become obvious to one skilled in the art through the summary of the invention that follows.

SUMMARY OF THE INVENTION

According to embodiments of the present invention, an identification tag carrying device comprises a body member having one or more cavities and one or more protrusions disposed at the first end of the body member. The invention further comprises a method of attaching said carrier device without the need for a specialized tool.

The foregoing summary of the present invention with the exemplary examples should not be construed to limit the scope of the invention. It should be understood by one skilled in the art that the examples of the invention thus described may be further modified without departing from the spirit and scope of the invention.

BRIEF DESCRIPTION OF THE DRAWINGS

Embodiments of the present invention will now be described, by way of example only, with reference to the following diagrams wherein.

DETAILED DESCRIPTION

Figure 1:
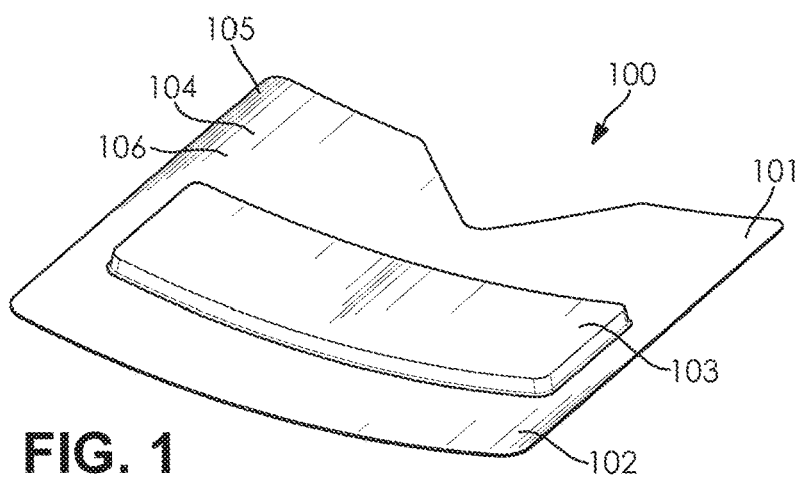
FIG. 1 shows an identification tag carrying apparatus in accordance with an embodiment of the present invention.
Figure 2:
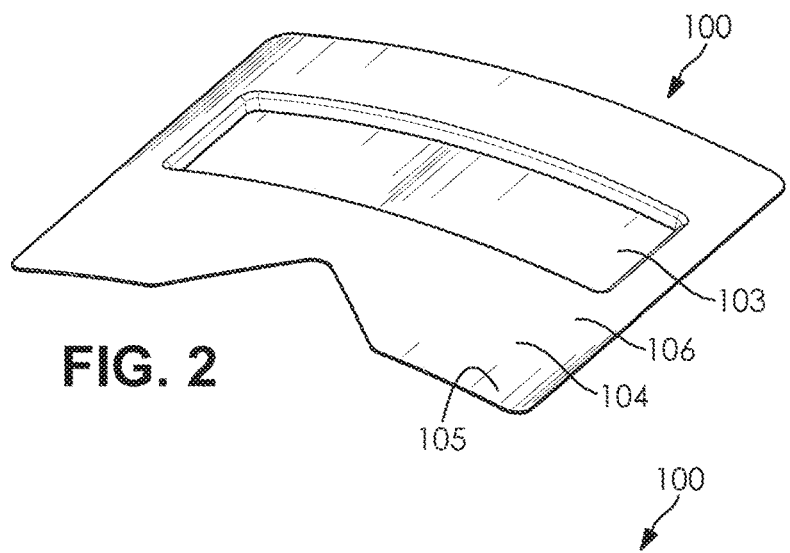
FIG. 2 shows an identification tag carrying apparatus in accordance with an embodiment of the present invention.
Figure 3:
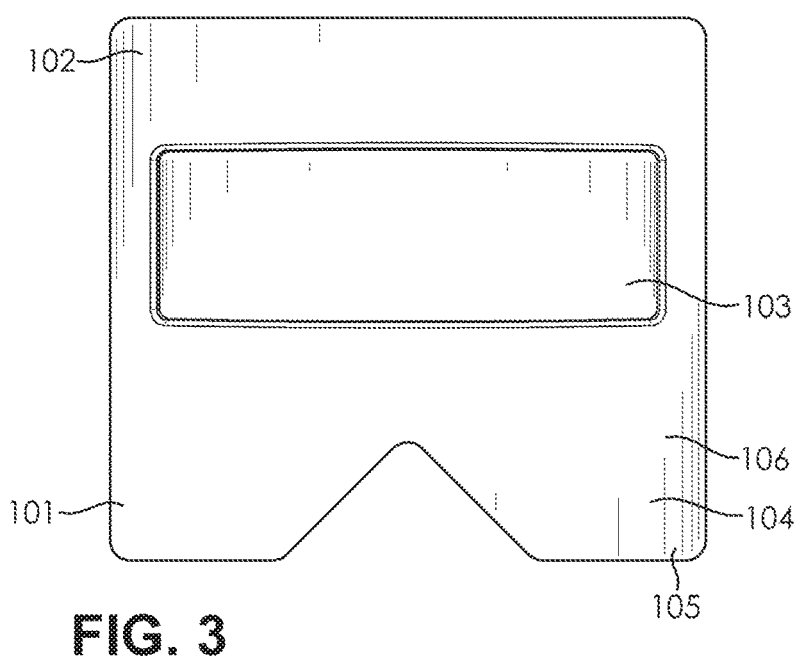
FIG. 3 shows an identification tag carrying apparatus in accordance with an embodiment of the present invention.
Figure 4:
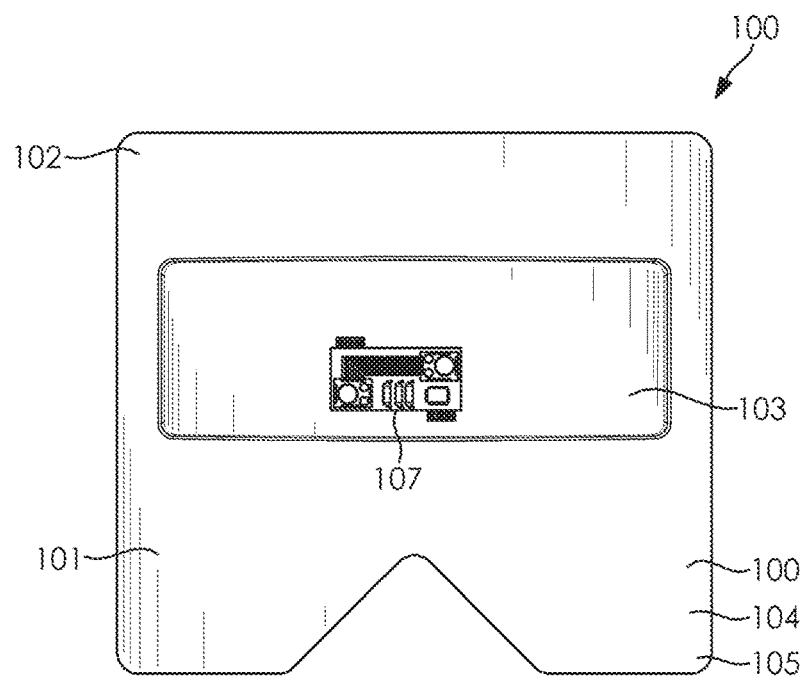
FIG. 4 shows an identification tag carrying apparatus in accordance with an embodiment of the present invention.
Figure 5:
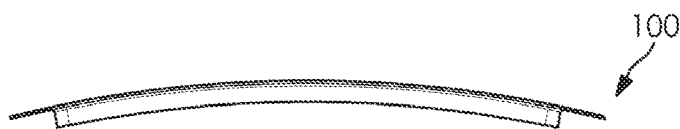
FIG. 5 shows an identification tag carrying apparatus in accordance with an embodiment of the present invention.
Figure 6:
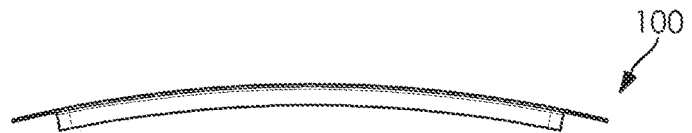
FIG. 6 shows an identification tag carrying apparatus in accordance with an embodiment of the present invention.
Figure 7:
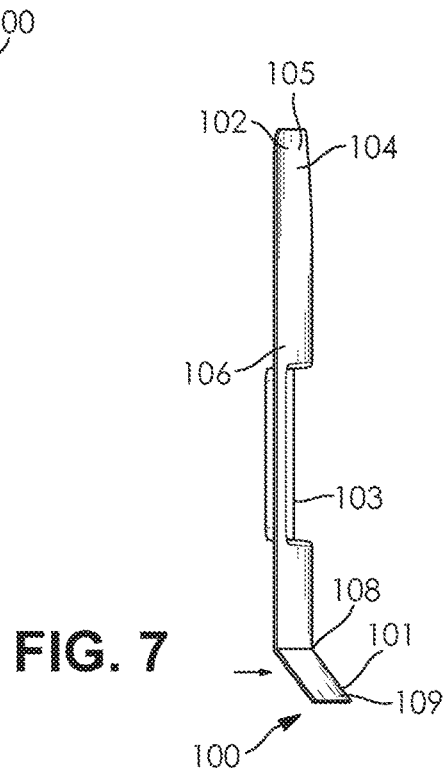
FIG. 7 shows an identification tag carrying apparatus in accordance with an embodiment of the present invention.
Figure 8:
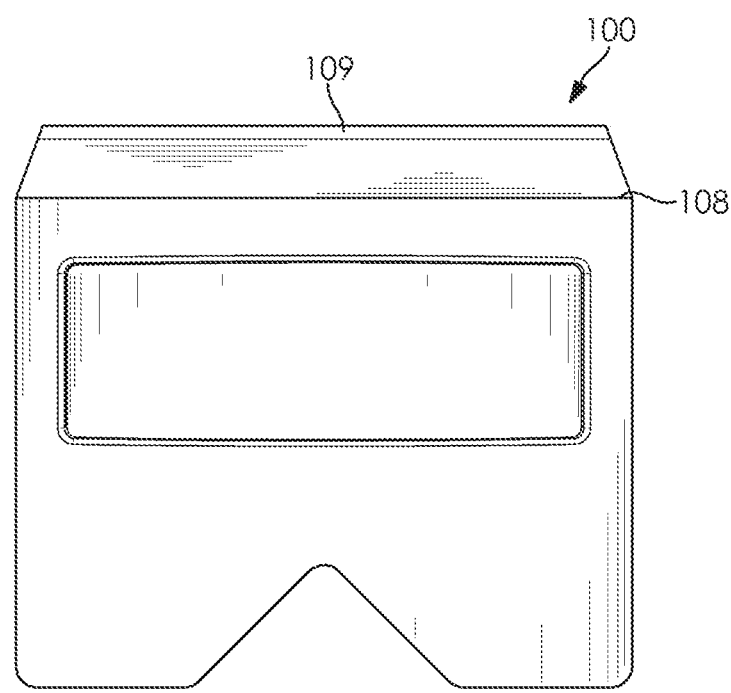
FIG. 8 shows an identification tag carrying apparatus in accordance with an embodiment of the present invention.

In the Summary above, the Detailed Description, the claims below, and in the accompanying drawings, reference is made to particular features (including method steps) of the present invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Whenever a reference herein is made to a method comprising two or more defined steps, the defined steps can be carried out in any order or simultaneously (except where the context excludes that possibility), and the method can include one or more other steps which are carried out before any of the defined steps, between two of the defined steps, or after all of the defined steps (except where context excludes that possibility).

The present invention is directed to an apparatus and method to satisfy the need for an efficient and cost-effective device and method to attach identification tags such as RFID tags or barcodes to assets or canisters such as beverage kegs or gas cylinders. The apparatus having features of the present invention may comprise one or more electronic sensors or barcodes configured with and attached to a carrying device that can, without the need for additional fasteners or adhesives, be attached to a reusable asset or canister such as a beverage keg or gas cylinder. Such features allow users to quickly and cost effectively attach identification tags to these assets.

The various styles and sizes of assets which involve attaching devices make a universal attaching device desirable. Various configurations and arrangements of identification tags and assets are contemplated by the several embodiments of the present invention as they may be individually deployed. In an exemplary embodiment, the identification tag carrying apparatus is a one-piece device which contains the identification tag and the carrier device that can be affixed to an asset without the use of additional tools, adhesives or fasteners.

According to embodiments of the present invention, an identification tag carrying apparatus has the ability to carry or hold RFID tags, sensors, barcodes and the like identification tags (hereinafter collectively referred to as "identification tags"). In some embodiments, the invention may comprise additional or alternate components that will become understood by one of skill in the art as suitable for implementing the system taught herein, in each case without departing from the spirit or scope of the invention.

It is a primary object of the present invention to provide and improved identification tag carrying apparatus comprised of a carrier device having the ability to house a sensor and easily attach to assets or canisters such as beverage kegs and gas cylinders. For the purpose of illustration, the asset to which the carrier device is to be affixed will be described herein as a canister.

Referring now to FIGS. 1-8, a carrier device 100, in accordance with embodiments of the present invention, is shown. The carrier device 100 has a first end 101 and a second end 102 and generally comprises a cavity 103 and one or more protrusions 104. Protrusions 104 have a first end 105 and a second end 106. In some embodiments, the carrier device 100 comprises an identification tag 107. In some embodiments, the carrier device 100 comprises a beveled edge 108. In some embodiments, the carrier device 100 comprises a hinge 109. In some embodiments, the hinge 109 is flexible. In some embodiments, the cavity 103 of the carrier device 100 holds an identification tag 107. In some embodiments, the carrier device 100 is primarily composed of a flexible material.

According to embodiments of the present invention, cavity 103 acts as a housing for identification tags 107. In some embodiments, the identification tag 107 may be attached to the cavity. In some embodiments, an adhesive material may be used to attach the identification tag 107 to the cavity 103. In some embodiments, the identification tag 107, in its relaxed state, may be slightly greater in height than the height of recessed portion 11 of a canister 10. In some embodiments, the identification tag 107, in its deformed state, generally corresponds to the height of the recessed portion 11 of a canister 10. In some embodiments, the cavity 100 and identification tag 107 within the cavity 103 are flexible and constructed to bend, and remain flexed or bent when the carrier device 100 is placed in a recessed portion of a given canister 10.

According to embodiments of the present invention, the carrier device 100 has one or more protrusions 104 at its first end. In some embodiments, the protrusions 104 are flexible. In some embodiments, the protrusions 104 are formed of a resilient material. In some embodiments, the protrusions 104 bend or compress facilitate the attachment of the carrier device 100 to an assortment of canisters 10 of varying shapes, sizes and configurations. The protrusions 104 may enable attachment of the carrier device 100 to a canister 10 by flexing or bending to allow the carrier device 100 to fit into a curved or creased edge of a canister 10. In embodiments with two protrusions 104 or more, the protrusions 104 are spaced apart from one another. As shown in FIG. 1, in some embodiments, the protrusions 104 are distanced further apart from one another at their first ends 105 than at their second ends 106. In some embodiments, the protrusions 104 may be of a greater thickness at their bottom portion than their top portion. In some embodiments, the protrusions 104 may deform to fit inside the top portion of recessed portion 11 of the canister 10. In some embodiments, the protrusions 104 may be of a thickness having sufficient strength to hold their deformed shape when the carrier device 100 is installed in the recessed portion 11 of a canister 10. In some embodiments, the outer surface of the protrusions 104 may be smooth. In some embodiments, the outer surface of the protrusions 104 may be rough. In some embodiments, the protrusions 104 may be composed of a material whose coefficient of friction is greater than that of the outer surface of the recessed portion 11 of the canister 10. Depending on the desired implementation of the carrier device 100, the size of the device differs to enable the device to attach to a desired canister 10. Accordingly, the size, length and orientation of the protrusions 104 may differ to allow the carrier device 100 to affix to a given canister 10.

In some embodiments, the beveled edge 108 and hinge 109 create retention forces once the carrier device 100 is installed into the recessed portion 11 of a desired canister 10 by creating tension, facilitating the attachment of the carrier device 100 to the desired canister 10. In some embodiments, the hinge 109 is flexible. In some embodiments, the hinge 109 is composed of a resilient material. In some embodiments, the beveled edge 108 is flexible. In some embodiments, the beveled edge 108 is composed of a resilient material. In some embodiments, the beveled edge 108 may be of a greater thickness at its top portion than its bottom portion. In some embodiments, the beveled edge 108 may deform to fit inside the bottom portion of the recessed portion 11 of the canister 10. In some embodiments, the beveled edge 108 may be of a thickness having sufficient strength to hold its deformed shape when installed in the recessed portion 11 of a canister 10. In some embodiments, the outer surface of the beveled edge 108 may be smooth. In some embodiments, the outer surface of the beveled edge 108 may be rough. In some embodiments, the beveled edge 108 may be composed of a material whose coefficient of friction is greater than that of the outer surface of the recessed portion 11 of the canister 10.

According to embodiments of the present invention, the carrier device 100 is designed to flex or bend to be of the same or similar contour as a recessed portion 11 of a canister 10 and to be of a thickness having sufficient strength to hold its shape when installed that the carrier device 100 corresponds to the typically curved recessed portion 11 of the canister 10 once the carrier device 100 is installed. This signifies that the carrier device 100, in its deformed or flexed state within the recessed portion 11, at least approximately corresponds in latitudinal cross section to the latitudinal cross section of the recessed portion 11 of the desired canister 10. Thus, once installed, the carrier device 100 is shrouded by the curved recessed portion of the canister 10 and remains attached to the canister 10 by the pressure and tension forces created between the carrier device 100, in its deformed or flexed state, and the recessed portion 11 of the canister 10.

According to embodiments of the present invention, the protrusions 104 bend or compress to facilitate the attachment of the carrier device 100 to an assortment of canisters of varying shapes, sizes and configurations. The protrusions 104 may enable attachment of the carrier device 100 to a canister 10 by flexing or bending to allow the carrier device 100 to fit into a curved or creased edge of a canister. In embodiments with two protrusions or more, the protrusions are spaced apart from one another. In some embodiments, the protrusions 104 are distanced further apart from one another at their first ends 105 than at their second ends 106. Depending on the desired implementation of the carrier device 100, the size of the device differs to enable the device to attach to a desired canister. Accordingly, the size, length and orientation of the protrusions 104 may differ to allow the carrier device to affix to a given canister.

According to embodiments of the present invention, the carrier device may have a beveled edge 108 and a hinge 109 at its second end 102. In some embodiments, the beveled edge 108 and hinge 109 create retention forces once the carrier device 100 is installed into the recessed portion of a desired canister 10 by creating tension, facilitating the attachment of the carrier device 100 to the desired canister 10.

In accordance with an exemplary embodiment of the present invention, the carrier device 100 may be constructed to attach to a beverage keg. Standard beverage kegs are constructed with domes or the like structures at their top portions. In accordance with embodiments of the present invention, the carrier device 100 is constructed to flex to fit between the chime curl and dome chime seam of a beverage keg. In some embodiments, the carrier device 100, in its relaxed state is of a generally greater height than the height of a chime curl of a desired canister. In some embodiments, the carrier device 100, in its deformed state, is of the same general height of a chime curl of a desired canister. In some embodiments, the carrier device 100 may "lock" or remain attached to a canister by the elastic deformation tension created between the deformed carrier device 100 and a recessed portion 11 of a desired canister. The size, shape, length and material of the carrier device may differ depending on the different intended implementations of the device, such as the differing sizes and shapes of the beverage kegs and beverage keg domes. In some embodiments, the carrier device 100 is installed by pushing the carrier device 100 into the space between a chime curl and a dome chime seam, such that the carrier device 100 becomes affixed to a canister such as a beverage keg, while the identification tag 107 within the cavity 103 of the carrier device 100 remains visible on an exterior portion of the beverage keg.

The benefits and advantages of the present invention are many as it can be used in a variety of settings and circumstances. One of the primary advantages of the present invention is that it provides a single-pieced device with easily attachable capabilities without requiring the use additional tools, fasteners or adhesives. Additionally, users are able to attach the carrier device 100, equipped with an identification tag 107, without the need for specialized tools. This is a significant benefit of the present invention, as the device is easy to install or attach, while being difficult to remove once it has been installed.

In accordance with embodiments of the present invention, a method for affixing a carrier device 100 to a desired canister is disclosed. In some embodiments, the method for affixing the device to the canister comprises the steps of: selecting the location where the device is to be attached to the canister, associating the identification tag 107 on the device to the canister in a data base or tracking software, and placing the device with the identification tag 107 on the canister 10 by pressing the protrusions 104 of the device into place to secure the device to the object.

A carrier device in accordance with embodiments of the present invention is advantageous to users because it does not involve the use of any tools to attach or affix the carrier device to a desired canister. The device is constructed for easy installment by hand and remains affixed or attached to the desired canister as a result of the pressure and tension created by the flexed carrier device and the recessed portion of a desired canister.

Additional practical benefits and advantages of the present system include the absence of many moving parts susceptible to deterioration due to use and wear-and-tear, thereby making the system more durable and long-lasting than it would have otherwise been. This may also involve less repair and provide a low cost of repair and maintenance of the system.

The exemplary disclosed identification tag carrying device may be used in all suitable applications involving identification tags. For example, the exemplary disclosed identification tag carrying device may be used in any suitable application for attaching identification tags such as RFID tags, sensors, barcodes and the like identification tags.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may have been omitted so as to not unnecessarily obscure the embodiments.

While multiple examples are disclosed, still other examples of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. An identification tag carrying device comprising:
   a body member having one or more identification tag holding cavities; and
   a first protrusion and a second protrusion that are both disposed at a first end portion of the body member;
   wherein the body member is formed of a rigid material; and
   wherein an aperture is disposed between the first protrusion and the second protrusion.

2. The identification tag carrying device of claim 1, wherein said one or more identification tag holding cavities are formed to retain one or more identification tags.

3. The identification tag carrying device of claim 1, wherein said identification tag carrying device is primarily formed of a metal material.

4. The identification tag carrying device of claim 1, wherein said identification tag carrying device is of a thickness having sufficient strength to maintain its form once installed in a recessed portion of a canister.

5. The identification tag carrying device of claim 1, wherein said identification tag carrying device includes one or more hinges at its second end.

6. The identification tag carrying device of claim 5, wherein said hinges are primarily formed of a resilient material.

7. The identification tag carrying device of claim 1, wherein said second end of the identification tag carrying device further comprises a beveled edge.

8. The identification tag carrying device of claim 1, wherein the first and second protrusions are tapered, with a thickness of the first and second protrusions decreasing in a direction moving toward the first end portion of the body member.

9. The identification tag carrying device of claim 8, further comprising a beveled edge and a hinge that are disposed at a second end portion of the body member, the second end portion disposed at an opposite end of the body member as the first end portion.

10. An identification tag carrying device comprising:
a body member having one or more cavities;
one or more protrusions disposed at a first end of the body member; and
one or more hinges disposed at a second end of the body member;
wherein the second end includes a beveled edge; and
wherein the one or more protrusions are tapered, with a thickness of the one or more protrusions decreasing in a direction moving toward the first end of the body member.

11. The identification tag carrying device of claim 10, wherein said one or more cavities are formed to retain one or more identification tags.

12. The identification tag carrying device of claim 10, wherein said identification tag carrying device is primarily formed of a resilient material.

13. The identification tag carrying device of claim 12, wherein at least a portion of said resilient material is a formed poly or metal substrate.

14. The identification tag carrying device of claim 10, wherein said identification tag carrying device is of a thickness having sufficient strength to maintain its form once installed in a recessed portion of a canister.

15. A method, comprising:
providing a body member having an identification tag holding cavity and one or more flexible protrusions disposed at a first end portion of the body member;
providing a canister having a recessed portion;
attaching an identification tag in the identification tag holding cavity;
deforming the one or more flexible protrusions from a relaxed state to a deformed state; and
disposing the body member in the recessed portion while the one or more flexible protrusions are in the deformed state.

16. The method of claim 15, further comprising ceasing the deformation of the one or more flexible portions when the body member is disposed in the recessed portion.

17. The method of claim 16, wherein the body member remains attached to the canister based on the body member applying pressure to the recessed portion of the canister as the one or more flexible portions move from the deformed state to the relaxed state.

18. The method of claim 17, wherein the body member includes a beveled edge and a hinge that are both disposed at a second end portion of the body member that is an opposite end of the body member than the first end portion, the beveled edge and the hinge applying pressure to the recessed portion as the one or more flexible portions move from the deformed state to the relaxed state.

19. The method of claim 15, wherein a height of the body member, when the one or more flexible portions are in the relaxed state, is greater than a height of the recessed portion.

20. The method of claim 15, wherein the canister is a beverage keg, and the recessed portion is formed between a chime curl and a dome chime seam of the beverage keg.

21. The method of claim 15, further comprising associating the identification tag to the canister in a database or tracking software.

22. The method of claim 15, wherein the one or more flexible protrusions include a first protrusion and a second protrusion, and an aperture is disposed between the first protrusion and the second protrusion.

* * * * *